US012318339B2

(12) United States Patent
Ulreich et al.

(10) Patent No.: US 12,318,339 B2
(45) Date of Patent: Jun. 3, 2025

(54) APPARATUS AND METHOD FOR POSITIONING A PATIENT

(71) Applicant: Sage Products, LLC, Cary, IL (US)

(72) Inventors: Daniel R. Ulreich, Cary, IL (US); Michael J. Rigoni, Cary, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 18/397,405

(22) Filed: Dec. 27, 2023

(65) Prior Publication Data

US 2024/0164966 A1 May 23, 2024

Related U.S. Application Data

(63) Continuation of application No. 17/850,166, filed on Jun. 27, 2022, now Pat. No. 11,890,243, which is a continuation of application No. 16/135,860, filed on Sep. 19, 2018, now Pat. No. 11,369,535.

(60) Provisional application No. 62/560,562, filed on Sep. 19, 2017.

(51) Int. Cl.

*A61G 7/10* (2006.01)
*A61G 7/00* (2006.01)
*A61G 7/05* (2006.01)
*A61G 7/057* (2006.01)

(52) U.S. Cl.

CPC ........... *A61G 7/1021* (2013.01); *A61G 7/001* (2013.01); *A61G 7/0525* (2013.01); *A61G 7/057* (2013.01); *A61G 7/1086* (2013.01); *A61G 7/109* (2013.01); *A61G 7/1001* (2013.01); *A61G 2200/16* (2013.01); *A61G 2200/32* (2013.01)

(58) Field of Classification Search

None

See application file for complete search history.

(56) References Cited

U.S. PATENT DOCUMENTS

| | | | |
|---|---|---|---|
| 4,987,625 | A | 1/1991 | Edelson |
| 5,067,189 | A | 11/1991 | Weedling et al. |
| 5,448,790 | A | 9/1995 | Saro et al. |
| 6,564,801 | B1 | 5/2003 | Frank |
| 11,369,535 | B2 | 6/2022 | Ulreich et al. |
| 2013/0205495 | A1 | 8/2013 | Ponsi et al. |

(Continued)

FOREIGN PATENT DOCUMENTS

| | | | |
|---|---|---|---|
| WO | WO-2015/081233 | A1 | 6/2015 |
| WO | WO-2020/041493 | A1 | 2/2020 |

OTHER PUBLICATIONS

Patienthandling, Jul. 15, 2014, https://www.youtube.com/watch?v=2paEgKKEK5o (Year: 2014).*

(Continued)

*Primary Examiner* — Adam C Ortiz

(74) *Attorney, Agent, or Firm* — FOLEY & LARDNER LLP

(57) ABSTRACT

A patient positioning system includes an inflatable patient support device having a width, and a positioning apparatus. The positioning apparatus including a wedge-shaped body, the wedge-shaped body configured to be placed under the inflatable patient support device to support a patient in a desired position, and a tail comprising an elongated piece of material extending from a front end of the wedge-shaped body, wherein a length of the tail is greater than the width of the inflatable patient support device.

18 Claims, 17 Drawing Sheets

(56) References Cited

U.S. PATENT DOCUMENTS

| | | | | |
|---|---|---|---|---|
| 2015/0101126 | A1 | 4/2015 | Reiners et al. | |
| 2015/0143628 | A1 | 5/2015 | Fowler et al. | |
| 2017/0065473 | A1 | 3/2017 | Scott | |
| 2018/0250180 | A1* | 9/2018 | Phalen | A61G 7/1028 |
| 2020/0138656 | A1 | 5/2020 | Davis | |

OTHER PUBLICATIONS

International Search Report and Written Opinion for International Application No. PCT/US2018/051763, mailed Nov. 21, 2018, 12 pages.

* cited by examiner

APPARATUS AND METHOD FOR POSITIONING A PATIENT

CROSS-REFERENCE TO RELATED APPLICATIONS

This application is a continuation of U.S. patent application Ser. No. 17/850,166, filed Jun. 27, 2022, which is a continuation of U.S. patent application Ser. No. 16/135,860, filed Sep. 19, 2018, which claims the benefit of and priority to U.S. Provisional Patent Application No. 62/560,562, filed Sep. 19, 2017, all of which are hereby incorporated by reference in their entireties.

BACKGROUND

Positioning wedges are used by healthcare workers in patient care to set a patient in a particular position or relieve pressure on certain points of the body. Commonly, these wedges are used to position a patient at an angle, in order to prevent pressure ulcers, bed sores and other conditions related to extended lengths of time spent on a bed or similar support surface.

Positioning wedges may be used to place a patient in a desired position for an extended period of time. However, when standard positioning wedges are used for patients having a relatively high body mass it may be difficult to maintain the wedges in place. For example, the wedge may be displaced from its desired position as the weight of the patient is applied to the wedge. As the wedge slides out from its desired position underneath the patient, the patient is no longer in the desired position to relieve pressure.

Extensive manipulation of the patient in order to place a positioning wedge may cause patient discomfort. Generally, manipulation of patients should be minimized in order to promote maximum patient comfort and avoid adverse effects from excessive manipulation of the patient. Both difficulty in initially positioning a wedge and frequent repositioning of the wedge contribute to the concerns regarding patient manipulation.

Healthcare workers also face the challenge of initially placing a positioning wedge when caring for a patient having a high body mass. Lifting these larger patients is often not an option as such a process would typically require multiple healthcare workers. In many instances, the extra workers necessary to assist with manipulating a heavier patient may not be immediately available to provide assistance meaning that the patient would not be able to be correctly positioned at the appropriate time.

DETAILED DESCRIPTION

Figure 1:
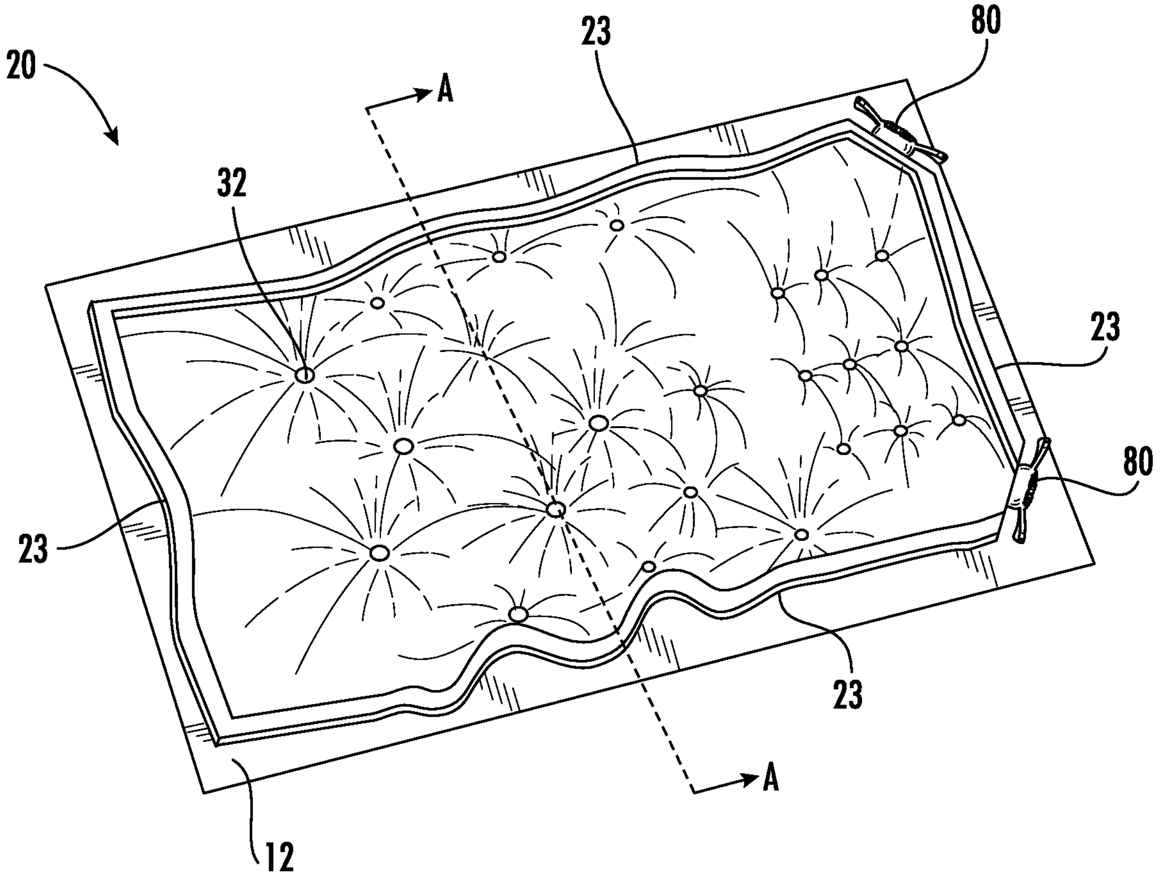
FIG. 1 is a top perspective view of an embodiment of an inflatable patient support device shown in an inflated state.

In general, the present disclosure relates to an apparatus and related method for transferring, positioning, boosting, turning, or otherwise moving a patient on a support surface or between support surfaces.

Referring to FIGS. 1-4B, according to an exemplary embodiment, an inflatable patient support device or support device 20 is shown, that is configured for use in transferring a patient resting on a support surface, such as a hospital bed. Support device 20 is also for use in elevating and supporting a patient as part of a system that allows for other equipment to be used for positioning or otherwise manipulating the patient. A patient may be placed on top of support device 20 with support device 20 laying on a support surface 12. Support surface 12 may be provided by a support structure, which may be a bed, gurney, stretcher, cot, operating table, or other support structure for medical and/or patient care use (e.g., for supporting a person in a supine or other position).

A support structure and corresponding support surface 12 may generally include features such as a frame and a supporting surface supported by the frame. In one embodiment, the support structure may include one or more bed sheets (such as a fitted sheet or flat sheet), as well as pillows, blankets, additional sheets, and other related components. In some embodiments, the support structure is adjustable such that the head (or other parts) of the support structure can be raised and lowered, such as to incline a patient's upper body. Support device 20 can be used with many different types of support structures, and may be used to transfer a patient from one support structure to another support structure of the same or a different type.

In one embodiment, support device 20 includes an inflatable body 30 that defines an internal cavity 31 (see FIG. 2) configured to be inflated with air or another gas. Inflatable body 30 is defined by at least a top sheet 26 forming a top wall of cavity 31 and a bottom sheet 27 forming a bottom wall of cavity 31, with top sheet 26 and bottom sheet 27 connected together to define the cavity 31. In some embodiments, top sheet 26 may vary in structure and/or function from bottom sheet 27. For example, top sheet 26 and bottom sheet 27 may be the same or different materials depending on the particular material properties desired for a specific embodiment of, or application for, support device 20. Top sheet 26 and bottom sheet 27 of support device 20 may further be designed to have very specific properties in terms of coefficients of friction. Other factors considered in the design of top sheet 26 and bottom sheet 27 of support device 20 may include but are not limited to breathability, durability, flammability, biocompatibility, pressure distribution profile, heat transmission, electrical conductivity, and cleaning properties. In some embodiments, one or both of top sheet 26 and bottom sheet 27 may be designed to avoid static electrical potential forming as a result of friction caused by airflow through support device 20.

Figure 2:
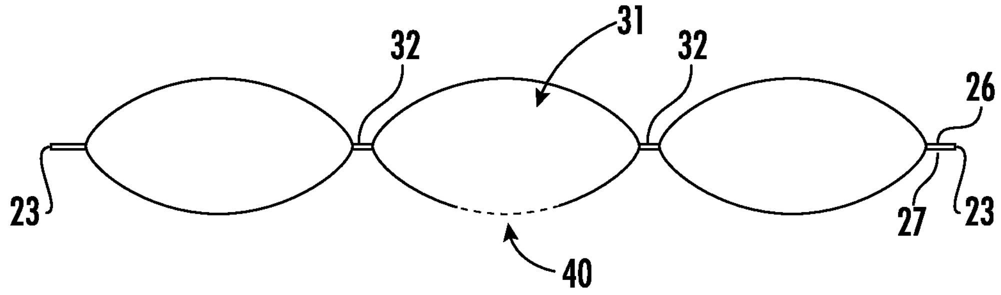
FIG. 2 is a cross-sectional view of the inflatable patient support device of FIG. 1, taken along the line A-A.
Figure 3:
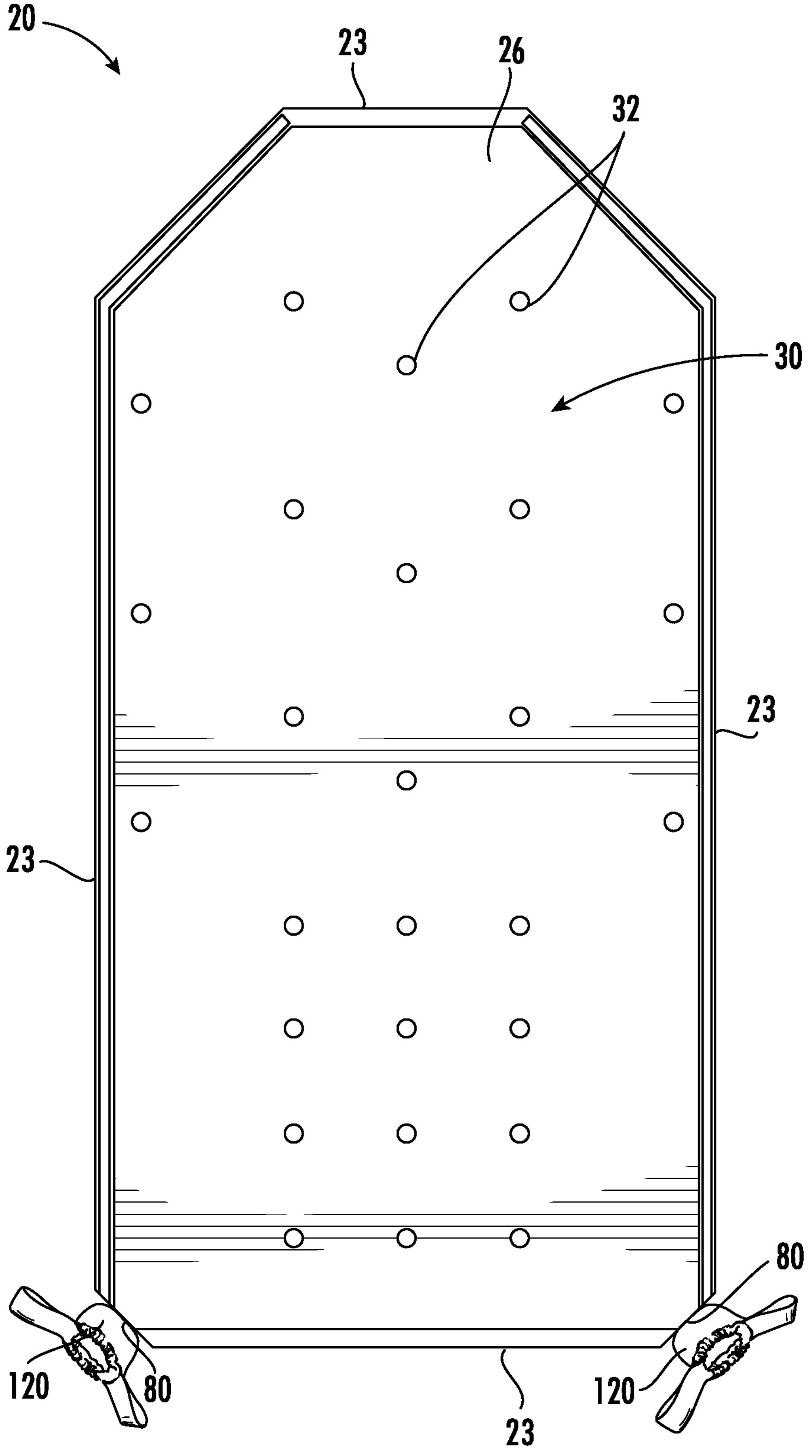
FIG. 3 is a top plan view of an inflatable patient support device of FIG. 1 shown in a non-inflated state according to one embodiment.

Inflatable body 30 of support device 20 may include one or more inflation-limiting structures to create a specific inflated shape for the support device 20, which are shown in a cross-sectional view in FIG. 2. In general, an inflation-limiting structure is a structure connected to one or both of top and bottom sheets 26, 27 of cavity 31 that limits the degree to which top and bottom sheets 26, 27 can move apart from each other during inflation. For example, in the embodiment shown, inflatable body 30 includes a plurality of connection areas 32 between top sheet 26 and bottom sheet 27 to form inflation-limiting structures. Connection areas 32 limit the relative expansion of top sheet 26 and bottom sheet 27, thereby acting as inflation-limiting structures. The areas between connection areas 32 swell when support device 20 is inflated to a degree determined by factors such as the configuration and orientation of other inflation limiting structures. The inflation limiting structures may have various different configurations according to various alternative embodiments When fully inflated, support device 20 has a shape defined by the configuration of edges 23 of support device 20, and the arrangement of the inflation-limiting structures, among other factors. The arrangement of connection areas 32 (e.g., spacing, location, and orientation with respect to each other) may influence the degree of inflation that occurs locally around each connection area 32, and connection areas 32 may be arranged in various patterns to accomplish specific desired shapes and characteristics of support device 20 upon inflation.

Figure 4A:
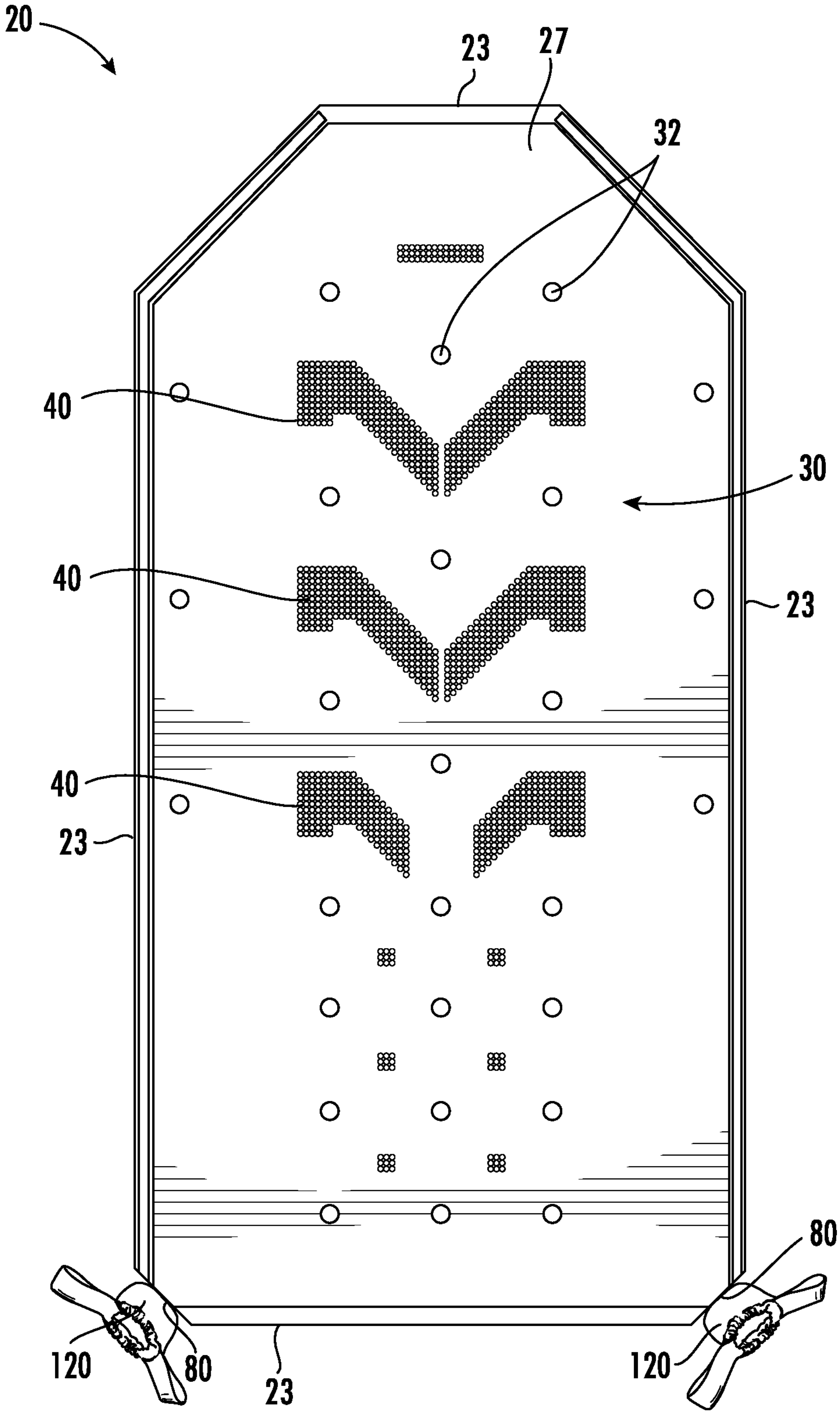
FIG. 4A is a bottom plan view of a first embodiment of the inflatable patient support device of FIG. 1 shown in a non-inflated state according to one embodiment.
Figure 4B:
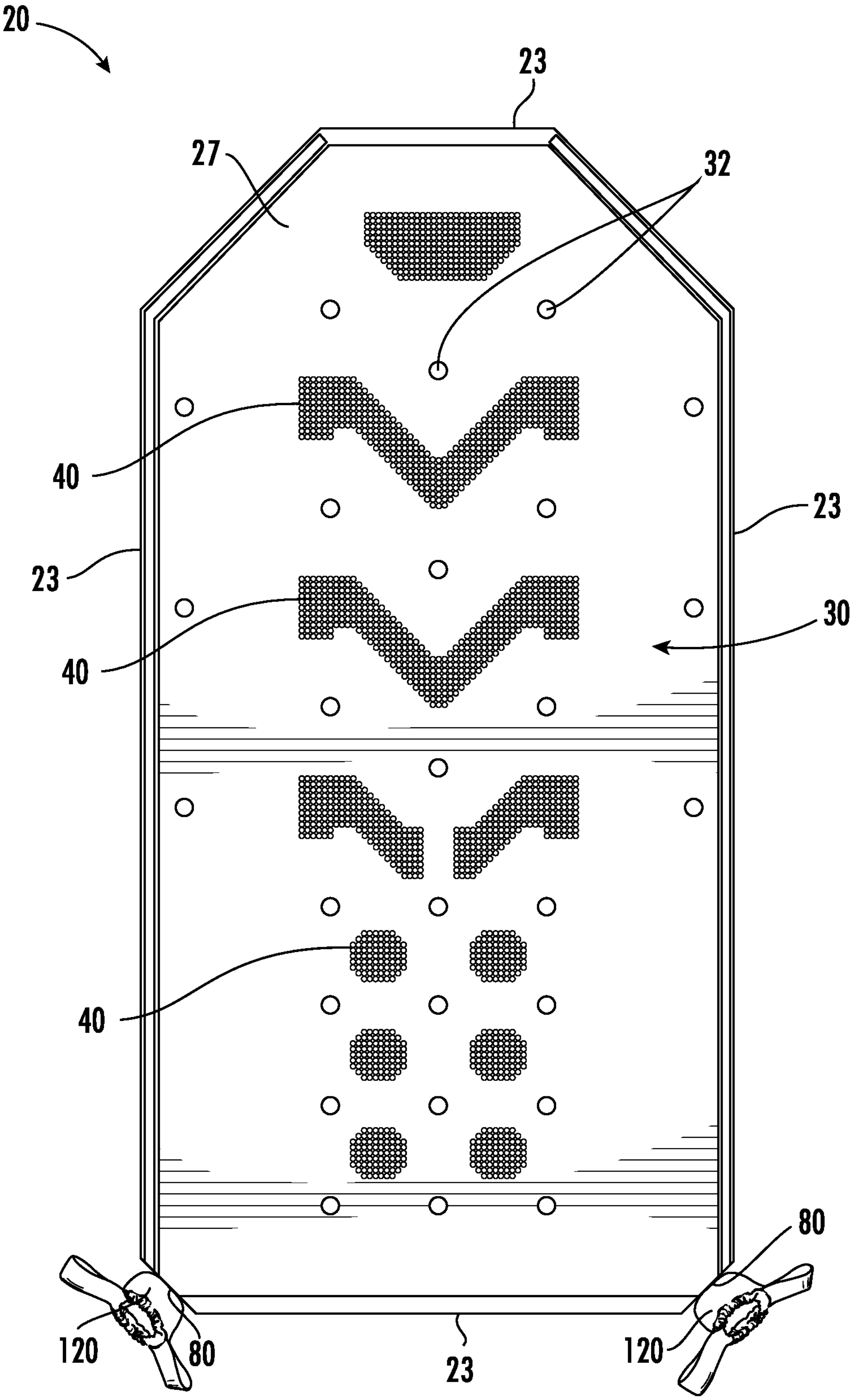
FIG. 4B is a bottom plan view of a second embodiment of the inflatable patient support device of FIG. 1 shown in a non-inflated state according to one embodiment.

Referring to FIGS. 4A and 4B, the inflatable device 20 includes a plurality of passages 40 in the bottom sheet 27 that permit air to pass from the cavity 31 to the exterior of the inflatable device 20. The passages 40 extend from the cavity 31 through the bottom sheet 27 to the exterior of the inflatable device 20. Air passing through the passages 40 is forced between the bottom surface of the inflatable device 20 and the surface upon which the inflatable device 20 sits (e.g., the support surface), reducing friction between the bottom surface and the support surface. This permits easier movement of the inflatable device 20 when a patient is positioned on the inflatable device 20.

As stated above, the passages 40 of the inflatable device 20 are intended to pass air between the bottom surface of the inflatable device 20 and the support surface upon which the inflatable device 20 sits. The effectiveness of these passages 40 in doing so is also impacted by the arrangement of the passages 40 in the bottom sheet 27. Several exemplary arrangements are shown in the figures, and described below. Generally, the passages 40 are arranged entirely, or more densely, in areas of the bottom sheet 27 that are in contact areas, where the bottom sheet 27 contacts the support surface when the inflatable device 20 is inflated and supporting a patient. The inflatable device 20 may also have non-contact areas. In particular, when the inflatable device 20 is inflated, the connection areas 32 and the areas surrounding them are drawn in towards the cavity 31 when inflated (due to the top sheet 26 and bottom sheet 27 being sewn together in these areas) and the bottom sheet 27 in these areas does not contact the surface. Accordingly, passages 40 positioned in this area would not be as effective for the intended purpose. Thus, it is preferred that all or most of the passages 40 are arranged in areas in between and spaced at a distance from the connection areas 32, which are the areas that are in contact with the surface when the device is inflated and supporting a patient.

FIG. 4A illustrates the passages 40 arranged in a first embodiment, and FIG. 4B illustrates the passages 40 arranged in a second embodiment. The distribution of passages 40 is not limited to the specific arrangements shown in the embodiments of FIGS. 4A-B. The passages may vary in number and distribution in any way that provides a sufficient amount of surface area for the effective passage of airflow between the bottom surface of the inflatable device 20 and the surface upon which the inflatable device 20 sits.

Referring again to FIGS. 1-4B, support device 20 further includes one or more inflation ports 80. Inflation port 80 may be positioned in several possible locations on support device 20. Inflation port 80 is configured to be coupled to an air output (provided by, for example, the pump 81 in FIG. 7). In some embodiments, support device 20 includes multiple ports 80, such as ports 80 provided on or near one or more different edges 23 of support device 20. Ports 80 may be used along any edge 23 of support device 20. If two inflation ports 80 are included, then support device 20 may be configured such that only one of the inflation ports 80 is used at any time. For example, a second inflation port 80 may be used if two air outputs are required to inflate the support device 20, such as for patients having a high body mass.

Figure 5:
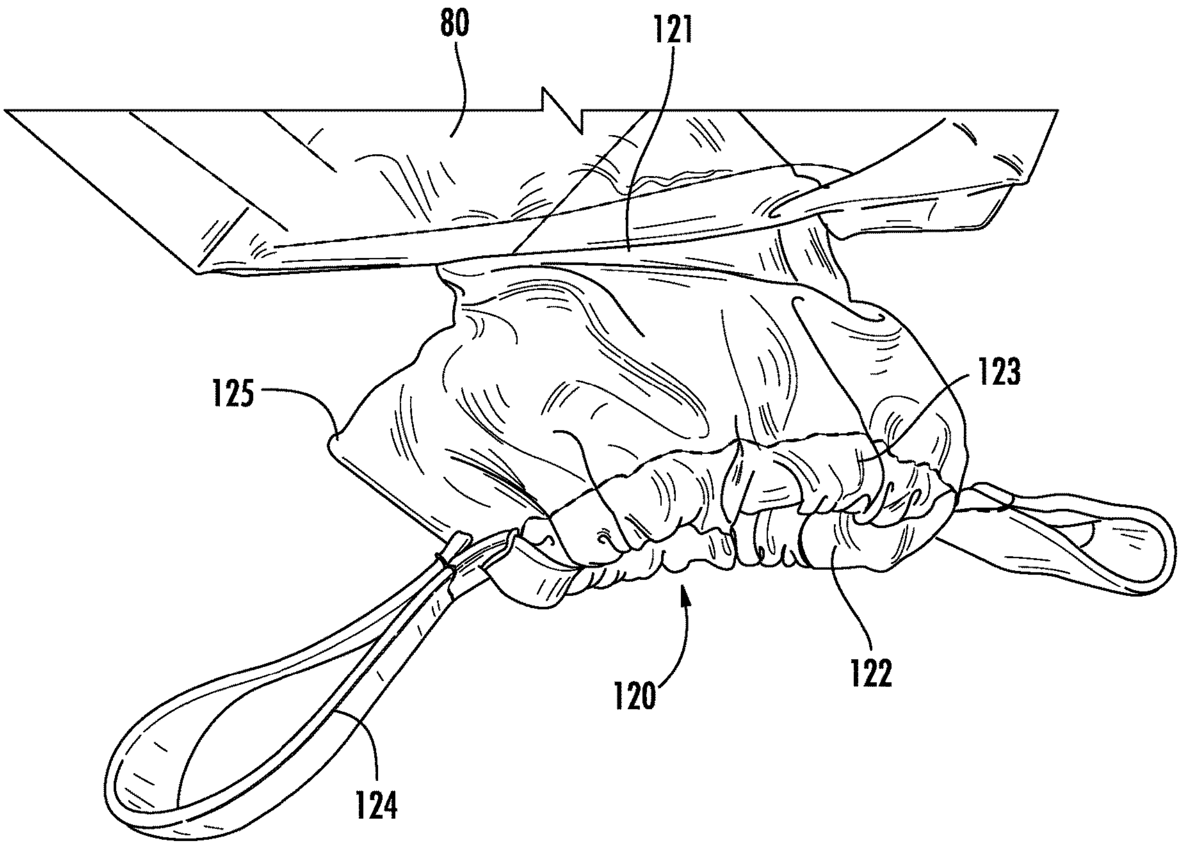
FIG. 5 is a perspective view of an inflation port usable in connection with an inflatable patient support device according to one embodiment.

Referring now to FIG. 5, a port sock 120 having a first opening 121 and a second port opening 122 may serve as or be used in combination with a port in support device 20. First opening 121 is configured to attach or connect to inflatable body 30 of support device 20 (e.g., by sewing first opening 121 to port 80). Port sock 120 may be connected to support device 20 in such a way that the port at second port opening 122 is not flush with side and foot edges 23 of support device 20. In other words, when port sock 120 is attached to support device 20, port sock 120 extends outwardly from support device 20. Extending port sock 120 outwardly from support device 20 prevents port sock 120 or port 80 from bunching up and ensures that support device 20 remains flat. Port opening 122 of port sock 120 may have a retaining mechanism 123, which is provided in the form of an elastic ring. Side handles 124 (e.g., straps or tabs) are disposed at or along an edge of port opening 122 of port sock 120. Side handles 124 are configured to allow for pulling retaining mechanism 123 to stretch open port opening 122 so that air output (for example, a hose having a nozzle, coupled to the pump 81 of FIG. 7) can be inserted into port opening 122. Side handles 124 allow for easier insertion of a nozzle into port opening 122 without stretching port opening 122 to a completely unstretched state. Side handles 124 are also configured to allow for pulling retaining mechanism 123 to open port opening 122 such that air output can be easily removed. Port sock 120 also includes side pouches 125 configured to engage with air output or an attachment to the air output, such as the nozzle 130 shown in FIGS. 6A-6B.

Figure 6A:
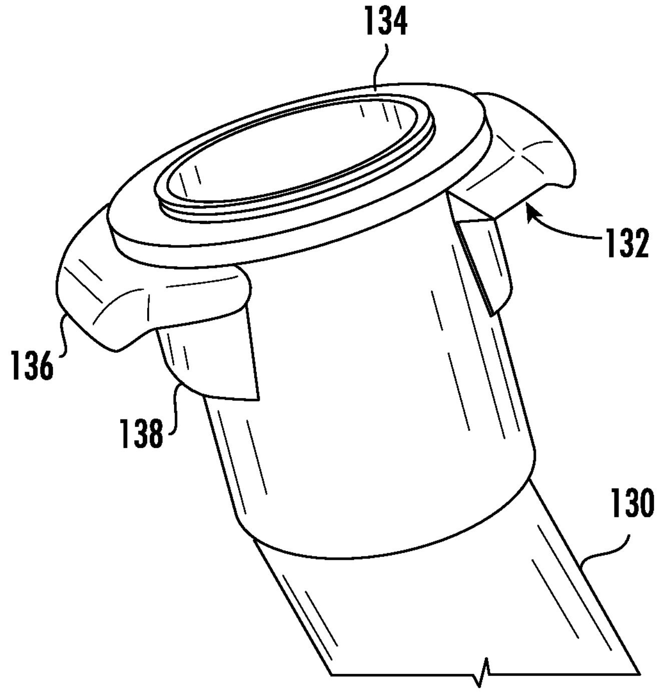
FIGS. 6A and 6B are detailed views of a nozzle portion of an air output according to some embodiments.
Figure 6B:
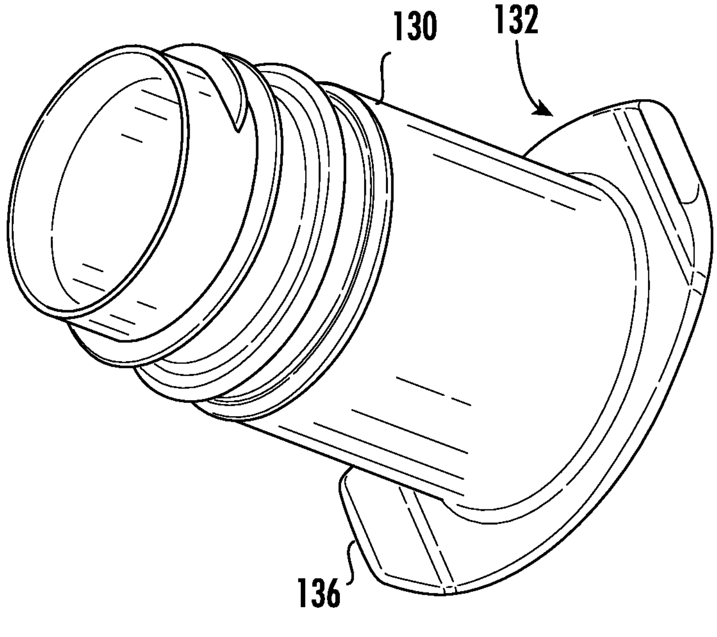
Figure 7:
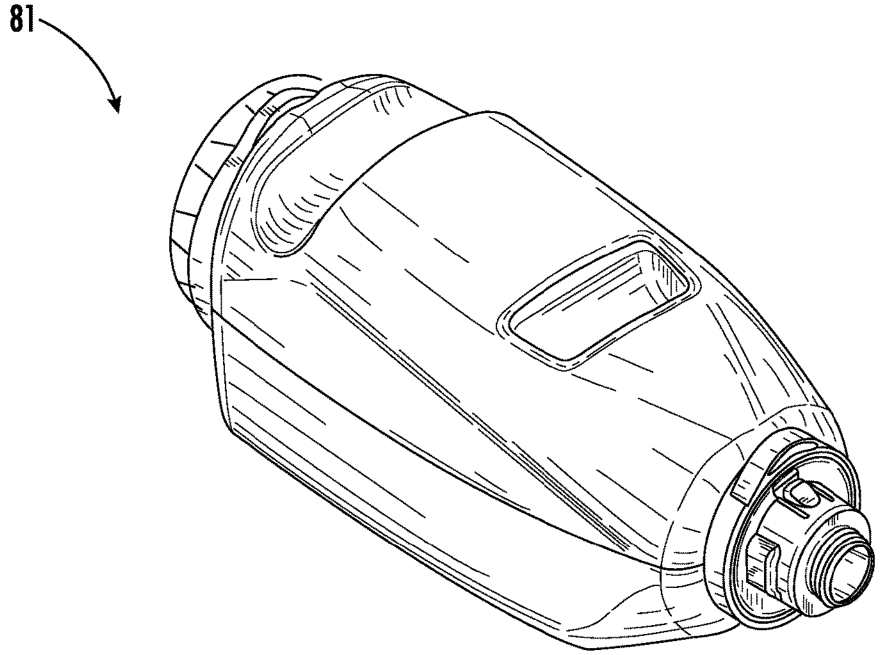
FIG. 7 is a perspective view of a pump usable as an air output in connection with an inflatable patient support device according to various embodiments.

A nozzle 130 of an air output which is configured to be disposed within port opening 122 is show in FIGS. 6A and 6B. In the embodiment shown in FIG. 6A, a clip 132 is configured to be disposed on a lip 134 of the nozzle 130 of the air output or otherwise around a distal portion of the nozzle. Clip 132 has a C-shape such that it can be easily put on and taken off of the nozzle. Clip 132 has any suitable configuration or design. For example, clip 132 includes extended side portions (e.g., flanges) 136 disposed along a front surface of clip 132 and which are configured to bend away from the front surface of clip 132 and a protrusion 138 which extends out and away from the top surface of clip 132. Clip 132 is configured such that when clip 132 is installed on the nozzle and the nozzle is placed in port sock 120, the extended side portions (e.g., flanges) 136 of clip 132 are disposed within side pouches 128 of port sock 120. Clip 132 is configured such that when it is installed on the nozzle, protrusion 138 of clip 132 wraps around an outer surface of nozzle in a secure fit. Alternatively, protrusion 138 of clip 132 is configured to snap into an inner surface of nozzle. Clip 132 is configured to prevent unintentional disengagement of the nozzle from port opening 122 or pouches 128 due to its increased diameter relative to the port opening 122. Additionally, the downward bend of extended side portions 136 are configured to prevent unintentional disengagement of the nozzle from port opening 122. Also, clip 132 is configured to prevent the nozzle from rotating relative to port opening 122 when the nozzle is disposed within port opening 122 because of the corresponding shape of the clip 132 with the side pouches 128 which allow positioning of the clip 132 in the port sock 120 in substantially only that orientation. In some aspects, clip 132 may be removable. In some aspects, clip 132 is manufactured as a single, unitary component with the nozzle, as shown in the embodiment of FIG. 6B. An embodiment of an air pump 81 is shown in FIG. 7. The air pump may include a hose (not shown) that serves as the air output having a distal end as described above and shown in FIGS. 6A and 6B.

Figure 8:
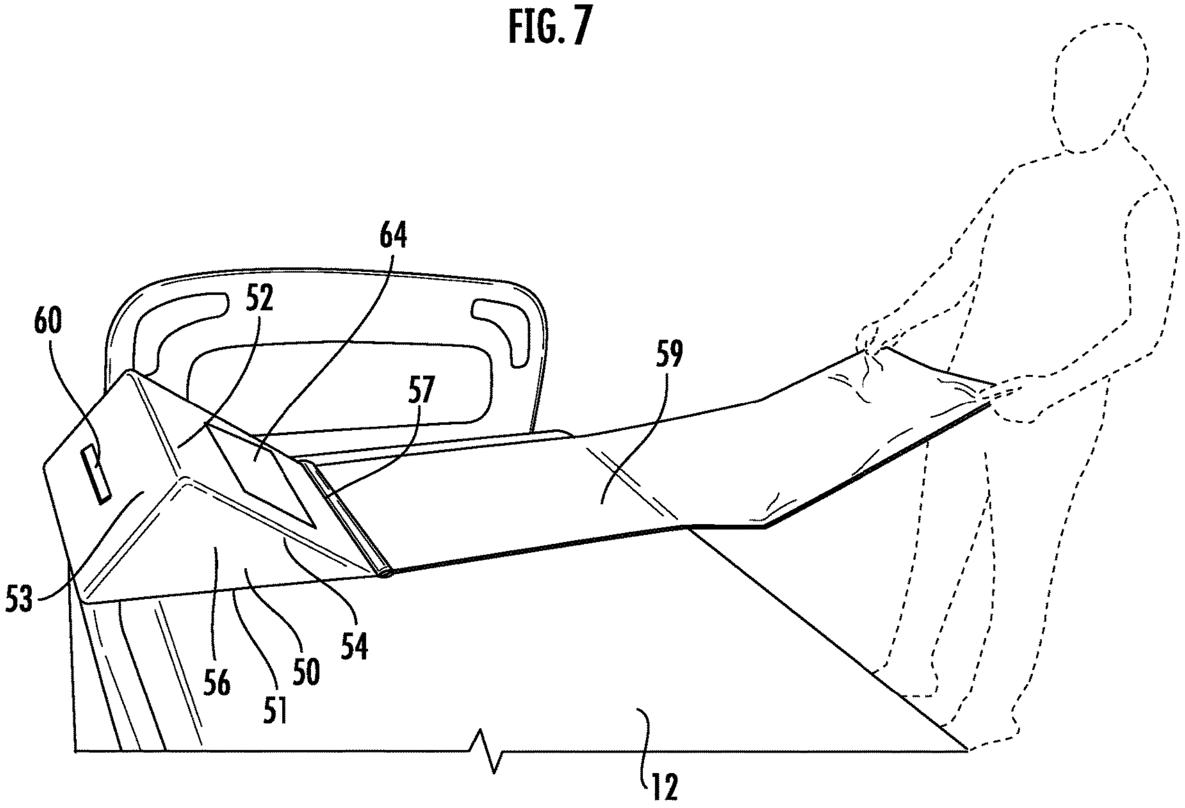
FIG. 8 is an image showing a positioning apparatus according to one embodiment.
Figure 9:
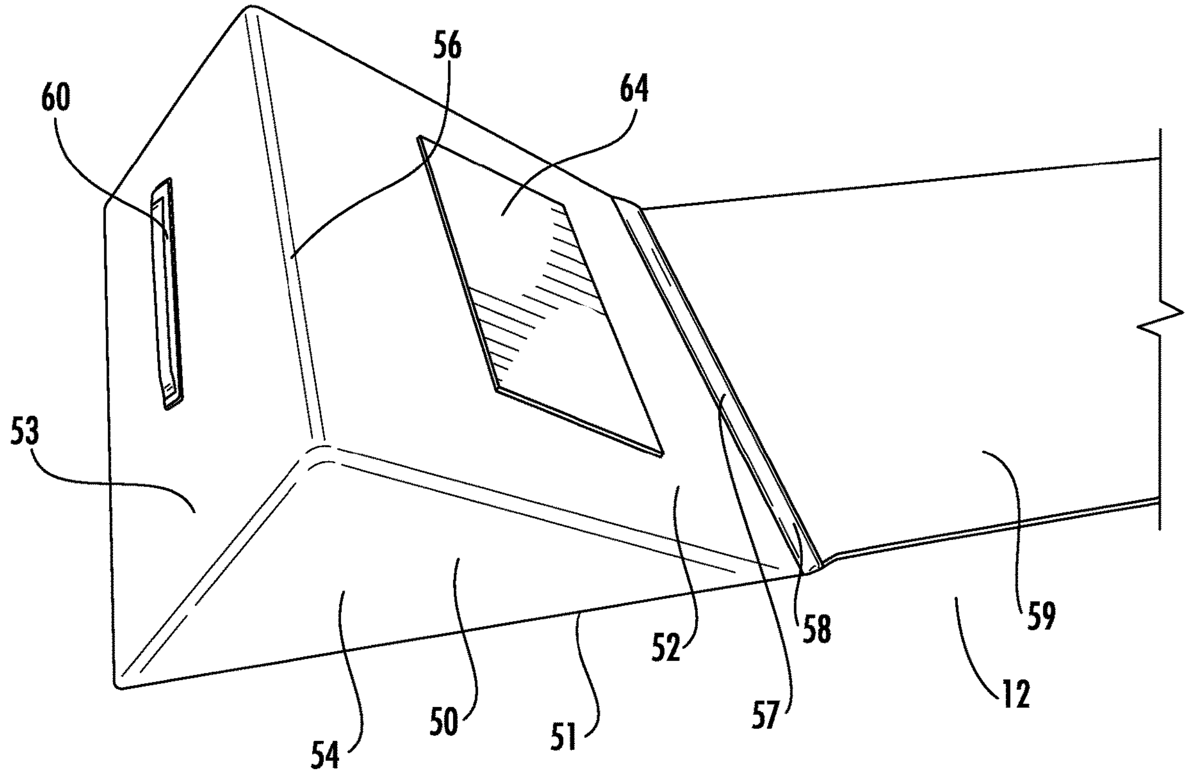
FIG. 9 is an image of a portion of the positioning apparatus of FIG. 8.
Figure 10:
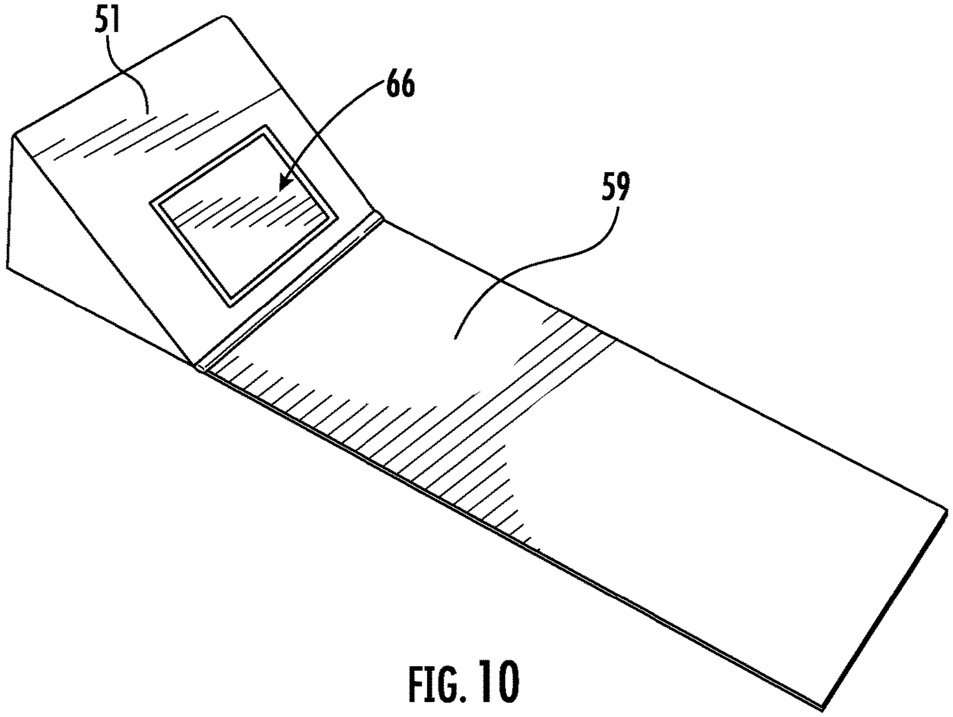
FIG. 10 is a perspective view of a bottom side of a positioning apparatus according to one embodiment.

Referring now to FIGS. 8-10, a positioning apparatus 50 (e.g., a wedge-shaped body, a positioning wedge, a bariatric wedge, etc.) usable in conjunction with support device 20 to position a patient in a desired position is shown according to one embodiment. Positioning apparatus 50 is positioned under support device 20 (see, e.g. FIG. 14) to provide a ramp and support to position and hold the patient slightly on his/her side. Positioning apparatus 50 includes a body 56 and a tail 59. Body 56 is in one embodiment wedge-shaped and includes a base surface 51, a ramp surface 52, a back wall 53, side walls 54, and a front end 57 near the connection between base surface 51 and ramp surface 52. In one embodiment, tail 59 is coupled to body 56 and in one embodiment includes an elongated piece of material extending from front end 57 of body 56. In one embodiment the tail 59 width is the same as the width of the front end 57 of the body. In another embodiment the tail 59 width is wider or narrower than the front end 57 of the body. The tail 59 can be coupled to the body 56 permanently, for example, using an adhesive or stitching, or temporarily such as by hook and loop fasteners. In another embodiment the tail 59 could be wrapped around the body 56 and attached to itself, forming a pocket containing the body 56. Tail 59 extends from ramp surface 52 of body 56 and is designed to assist with adjusting positioning apparatus 50 and sustain applied weight of a patient in order to serve as an anchor for positioning apparatus 50. With the weight of a patient applied to tail 59, positioning apparatus 50 is anchored in place by tail 59 to prevent positioning apparatus 50 from sliding or being otherwise displaced from its desired position underneath support device 20. Tail 59 may be a single layer of material, or may be formed of a number of layers coupled together. According to various embodiments, tail 59 has a length in the range of 0.5 meter to 3 meters. Tail 59, when extended from the front end 57 of body 56 lies substantially flat against support surface 12 when in use, and is free of any protruding members that would otherwise lead to portions of tail 59 being raised when resting on a flat surface. In other words, while lying extended and flat on a support surface, tail 59 is substantially planar. Tail 59 is, accordingly, a relatively thin or flat structure, in some embodiments made of a single sheet of material or a plurality of sheets of material coupled together with confronting surfaces. In this way, tail 59 is substantially unobtrusive to the patient and is configured to easily slide underneath support device 20 when being placed for patient use.

In some embodiments, tail 59 includes a tail bundling mechanism usable to bundle portions of tail 59 should tail 59 hang over an edge of support surface 12, preventing tail 59 from becoming tangled in other equipment, being positioned in the way of healthcare workers, or touching the floor. The bundling mechanism may be one or more straps, hook and loop fasteners, hooks, drawstrings, or similar mechanisms that can gather any excess material of tail 59.

In some embodiments, ramp surface 52 of positioning apparatus 50 includes an engagement member 64 coupled to or integrated into ramp surface 52. Engagement member 64 is configured to engage with a second material, such as the material of support device 20 under which positioning apparatus 50 is positioned. In the embodiment shown, engagement member 64 is or incudes a directional glide material designed to permit or inhibit movement along one or more axes in order to prevent positioning apparatus 50 from being displaced due to weight applied by a patient. In some embodiments, base surface 51 of body 56 may include an engagement member 66 similar in design to engagement number 64 (e.g., to permit or inhibit relative movement between positioning apparatus 50 and support surface 12).

Referring again to FIGS. 8-9, according to an exemplary embodiment, back wall 53 of body 56 includes a handle 60. Handle 60 is designed to aid healthcare workers in adjusting positioning apparatus 50 underneath support device 20. Handle 60 facilitates movement of positioning apparatus 50 both longitudinally along a patient and transversely relative to the patient.

Figure 11:
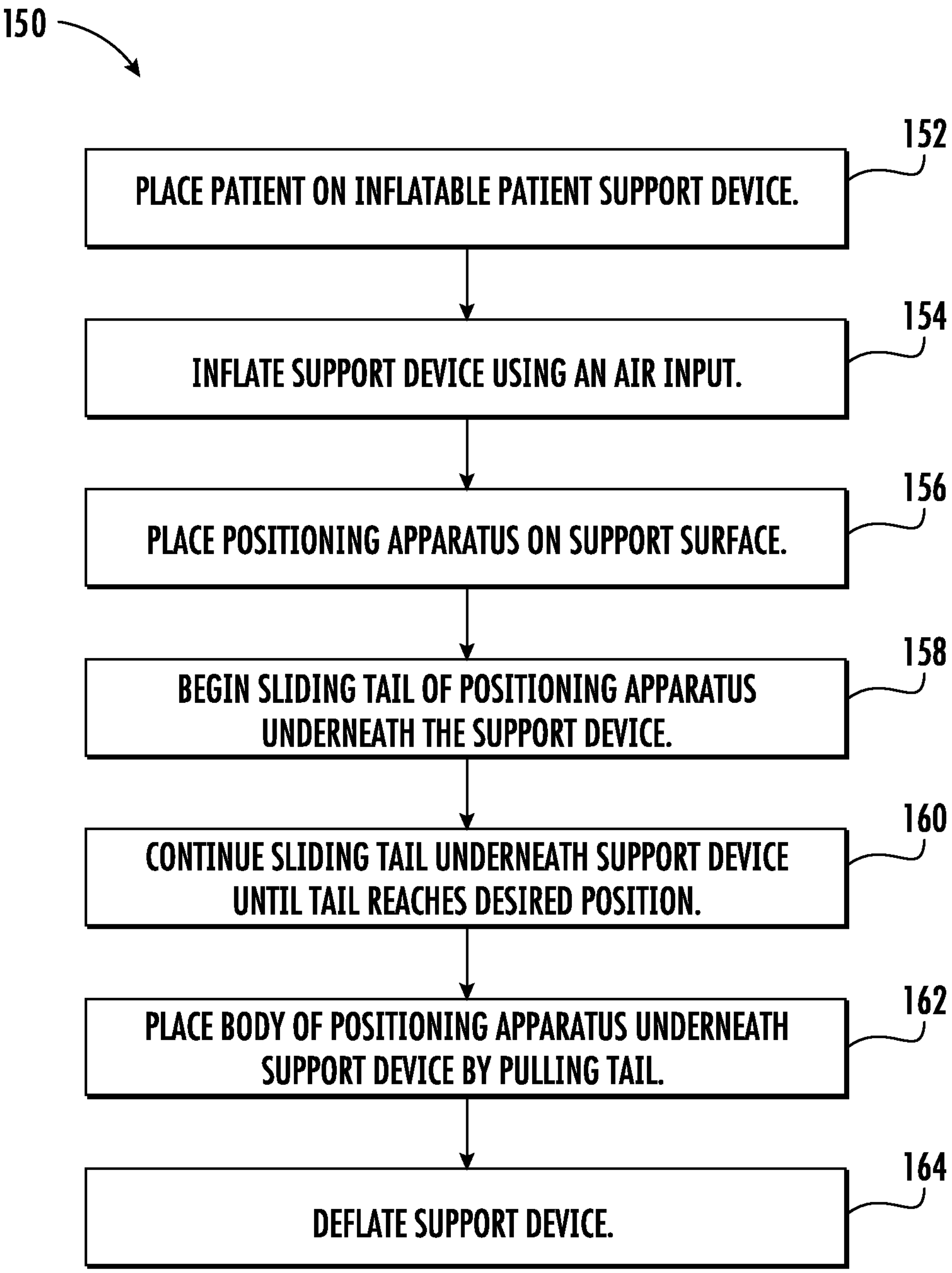
FIG. 11 is a flowchart of the steps for positioning a positioning apparatus according to one embodiment.

Referring to FIG. 11, a method 150 of using an inflatable patient support device and a positioning apparatus in combination to position a patient in a desired position is shown according to an exemplary embodiment. A patient is placed on an inflatable patient support device, such as support device 20, in a deflated state (step 152). The patient support device is inflated using, for example, the pump 81 shown in FIG. 7 to deliver air through an air output and into port 80 (step 154).

Figure 12:
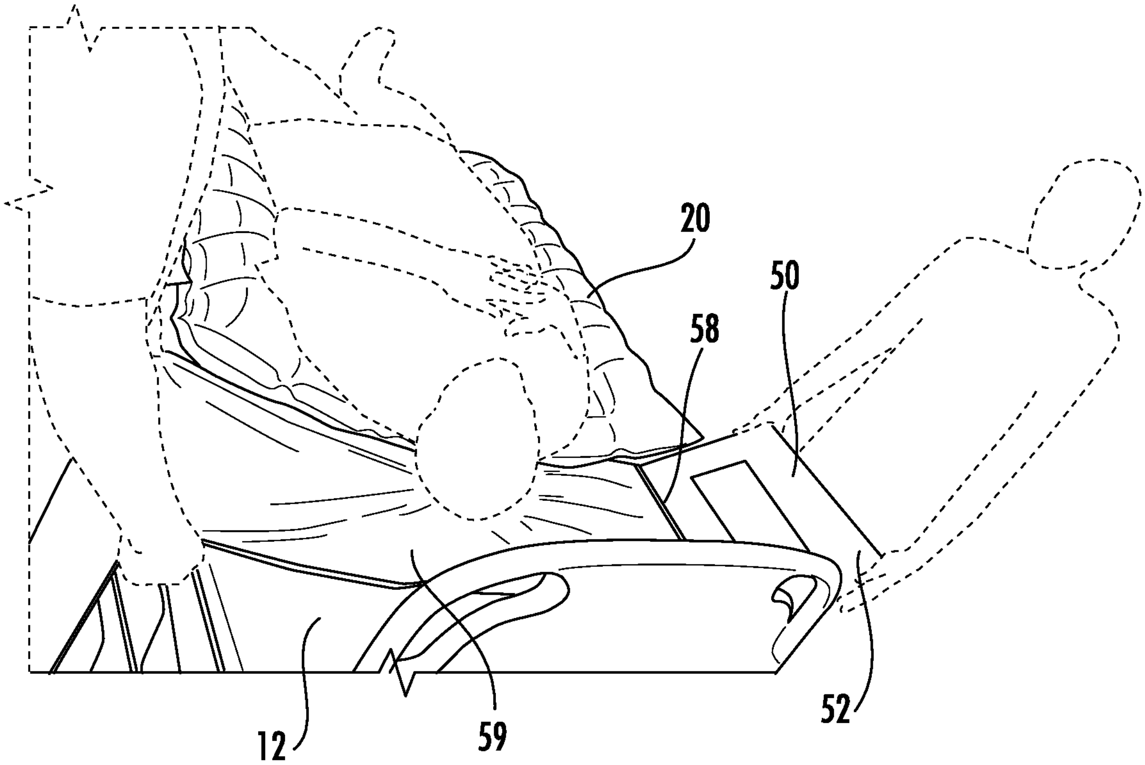
FIG. 12 is an image showing a positioning apparatus prior to being positioned underneath a patient according to one embodiment.

A positioning apparatus (e.g. positioning apparatus 50) is placed onto the support surface (e.g. support surface 12) supporting the support device (step 156). For example, as shown in FIG. 12 in connection with positioning apparatus 50, tail 59 of positioning apparatus 50 is laid substantially flat on support surface 12 near one end of the patient, for example near the patient's head or near the patient's feet. Body 56 of positioning apparatus 50 may extend just past one edge of support surface 12. Tail 59 of positioning apparatus 50 extends off the edge of support surface 12 on a side opposite body 56. As shown, one user holds body 56 such that ramp surface 52 of body 56 is facing upward and toward the patient, while another user holds tail 59 on the opposite side of support surface 12.

Figure 13:
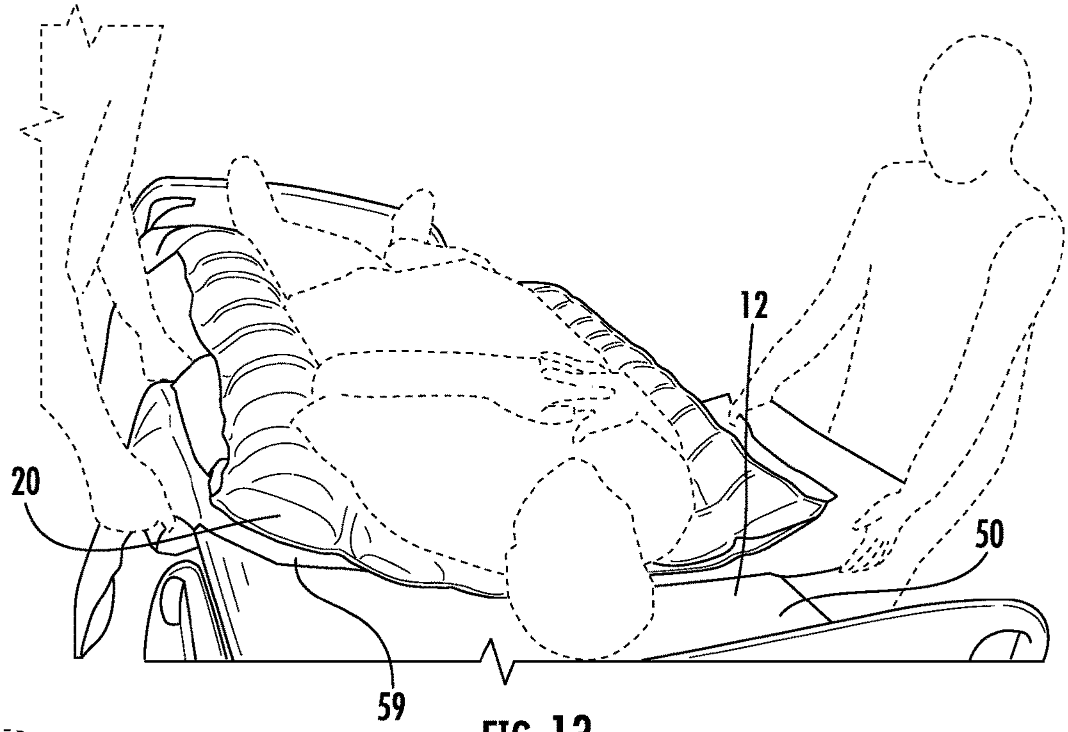
FIG. 13 is an image showing a tail of the positioning apparatus being positioned at an initial position underneath a patient according to one embodiment.
Figure 14:
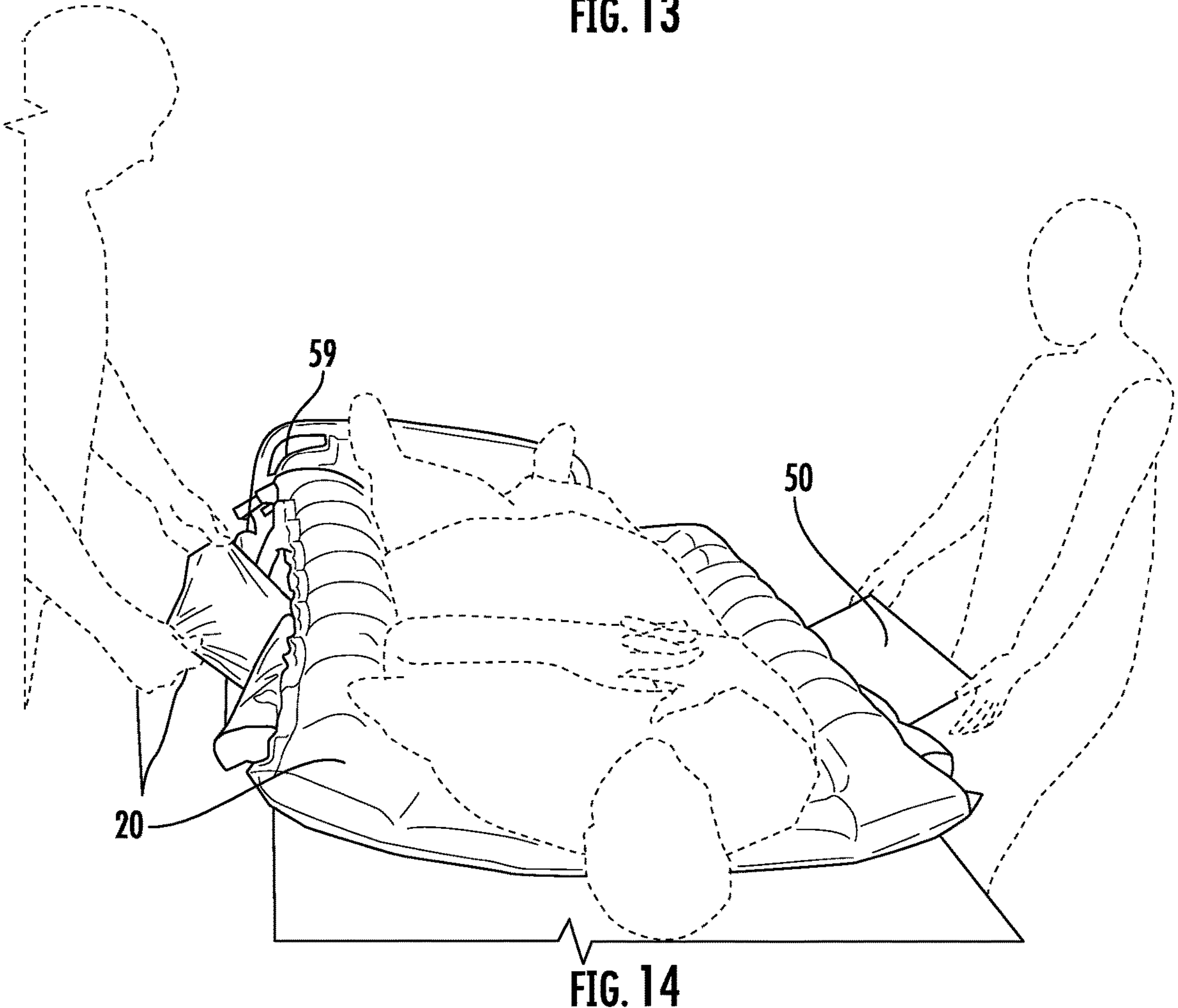
FIG. 14 is an image showing a tail of a positioning apparatus being positioned underneath a patient according to one embodiment.

Referring to FIGS. 11 and 13, tail 59 of positioning apparatus 50 is moved underneath the patient between support surface 12 and support device 20 (step 158). Support device 20, in its inflated state, may assist with sliding of tail 59 therebetween, at least in part due to a decrease in contact surface area and a distribution of the patient's weight over a larger area. Tail 59 remains underneath support device 20, which remains in an inflated state underneath the patient. Referring to FIGS. 11 and 14, positioning apparatus 50 is moved to its desired position relative to the patient (step 160).

Figure 15:
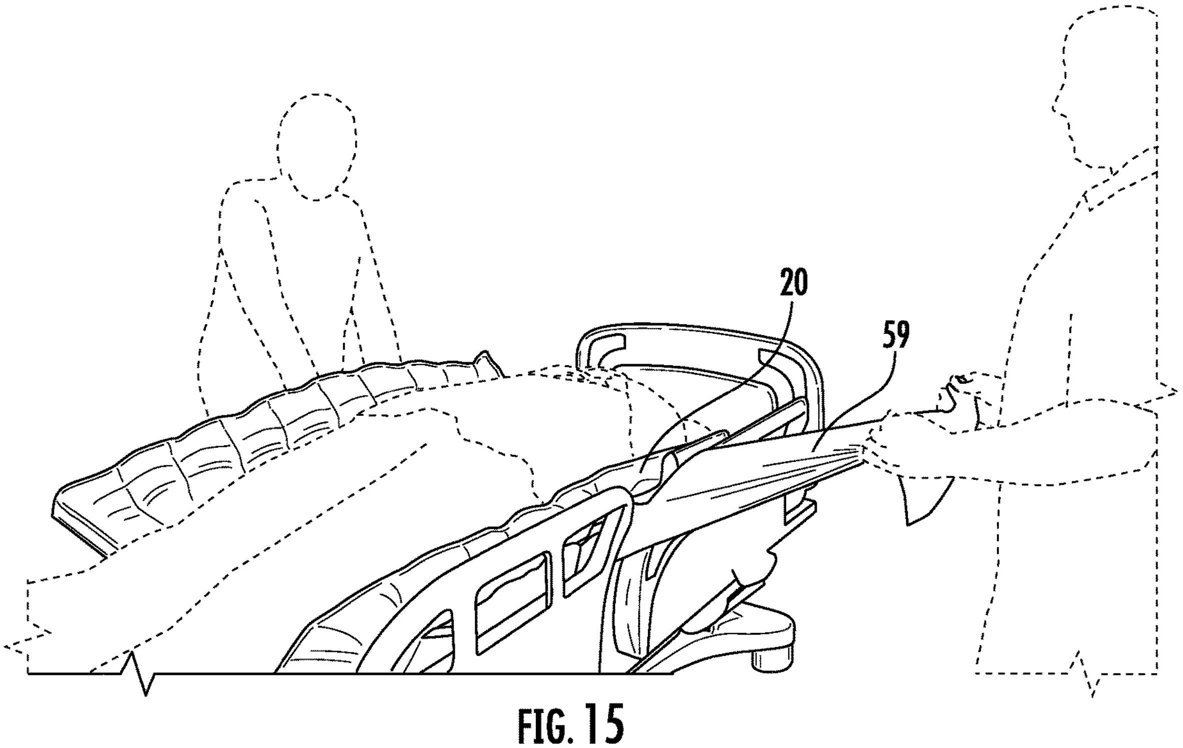
FIG. 15 is an image showing a body of a positioning apparatus being positioned underneath a patient according to one embodiment.

Referring to FIGS. 11 and 15, positioning apparatus 50 is positioned underneath support device 20 (step 162). As shown in FIG. 15, a user pulls tail 59, while another user guides body 56, which causes body 56 to move underneath support device 20, through manipulation of body 56 and tail 59. Body 56 and tail 59 are manipulated until positioning apparatus 50 is placed as desired under support device 20 relative to the patient.

Figure 16:
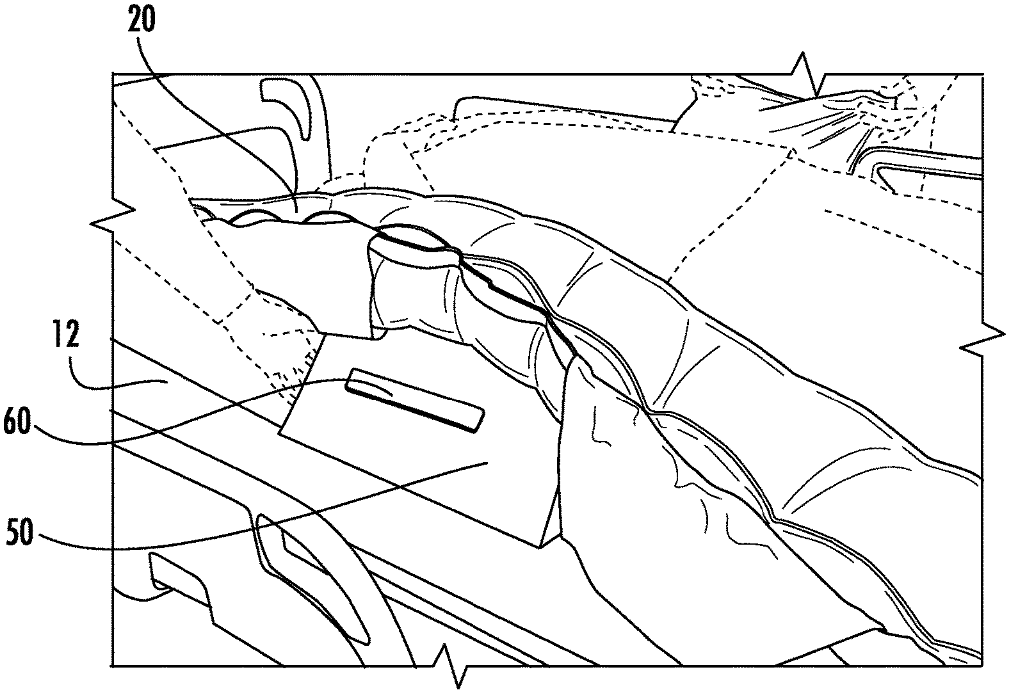
FIG. 16 is an image showing a body of a positioning apparatus positioned in a desired position underneath a patient according to one embodiment.

Placed positioning apparatus 50 is shown in FIG. 16 and the patient is applying weight to positioning apparatus 50 with support device 20 in an inflated state. Handle 60 is accessible by a healthcare worker should positioning apparatus 50 need to be removed or a minor adjustment made. When body 56 and tail 59 are positioned as desired, support device 20 is deflated (step 164). When deflated, the weight of the patient is applied to tail 59, thus anchoring positioning apparatus 50 in position relative to support surface 12.

Figure 17:
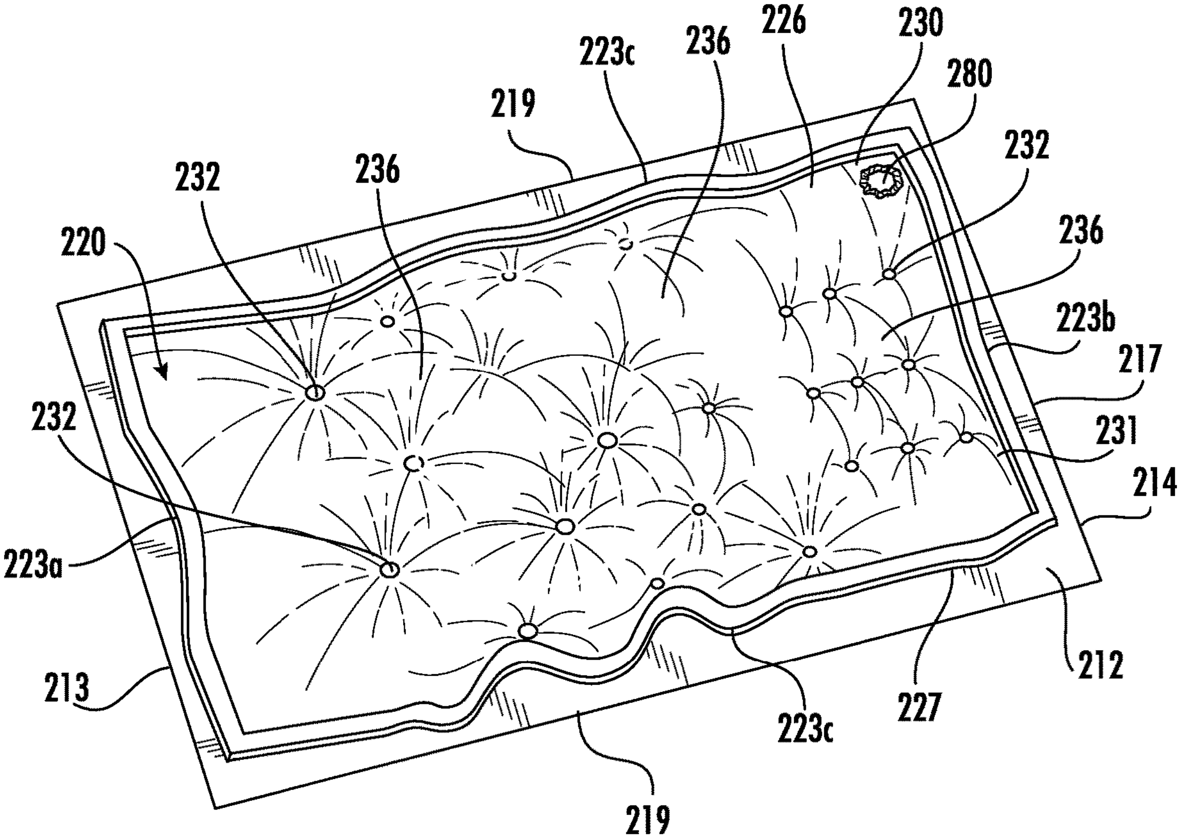
FIG. 17 is a top perspective view of a second embodiment of an inflatable patient support device shown in an inflated state.

Referring now to FIG. 17, a second exemplary embodiment of an inflatable patient support device 220 configured for use in transferring a patient resting on a support surface 12 is shown. As with the embodiment of FIG. 1, a patient may be placed on top of support device 220 with support device 220 laying on support surface 12.

Similar to device 20 of FIG. 1, support device 220 of FIG. 17 includes an inflatable body 230 that defines an internal cavity 231 configured to be inflated with air or another gas. Inflatable body 230 is defined by at least a top sheet 226 forming a top wall of cavity 231 and a bottom sheet 227 forming a bottom wall of cavity 231, with top sheet 226 and bottom sheet 227 connected together to define cavity 231. In some embodiments, top sheet 226 may vary in structure and/or function from bottom sheet 227. For example, top sheet 226 and bottom sheet 227 may be the same or different materials depending on the particular material properties desired for a specific embodiment of, or application for, support device 220. Top sheet 226 and bottom sheet 227 of support device 220 may further be designed to have very specific properties in terms of coefficients of friction. Other factors considered in the design of top sheet 226 and bottom sheet 227 of support device 220 may include but are not limited to breathability, durability, flammability, biocompatibility, pressure distribution profile, heat transmission, electrical conductivity, and cleaning properties. In some embodiments, one or both of top sheet 226 and bottom sheet 227 may be designed to avoid static electrical potential forming as a result of friction caused by airflow through support device 220.

Figure 18A:
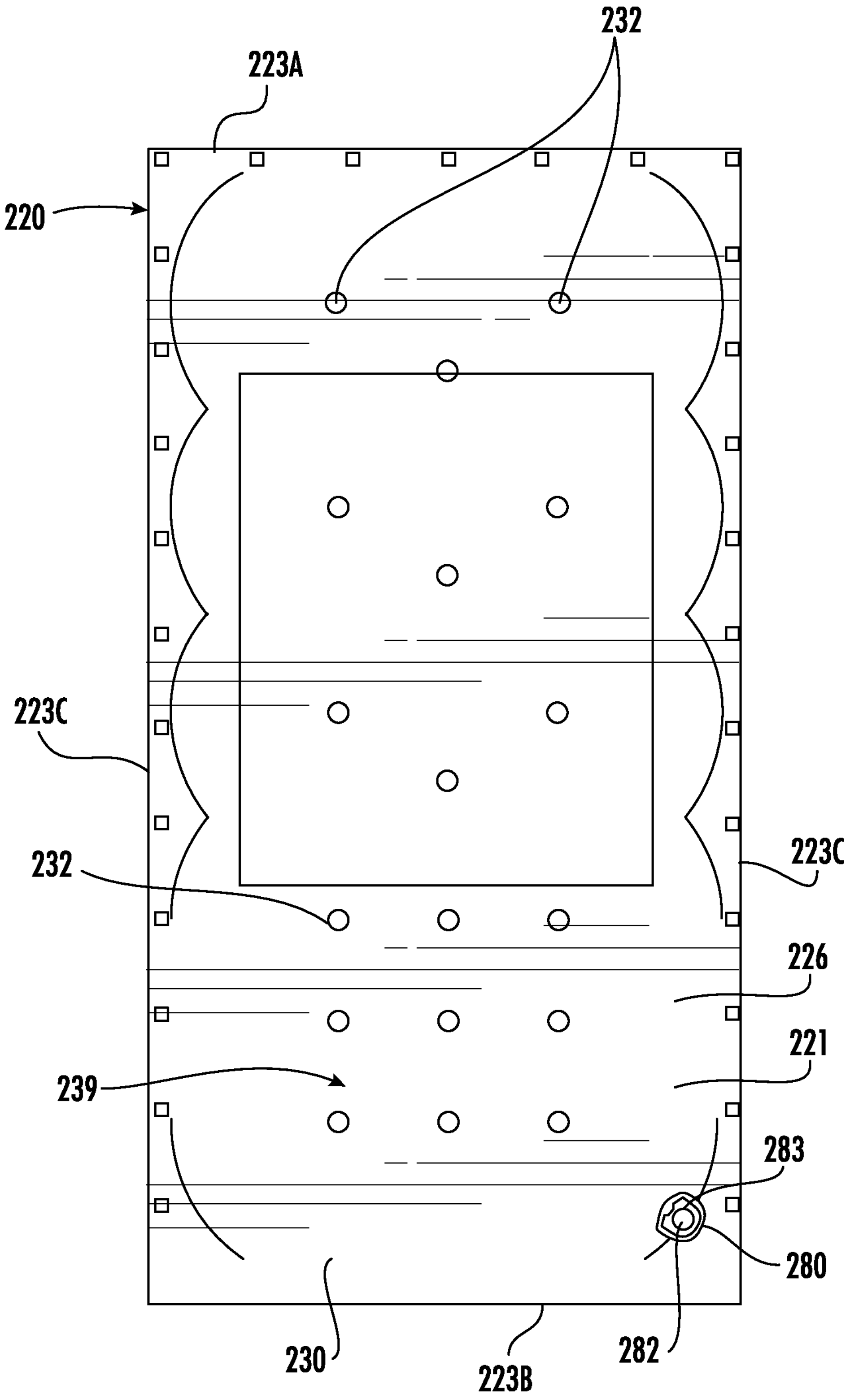
FIG. 18A is a top plan view of the inflatable patient support device of FIG. 17 shown in a non-inflated state according to one embodiment.
Figure 18B:
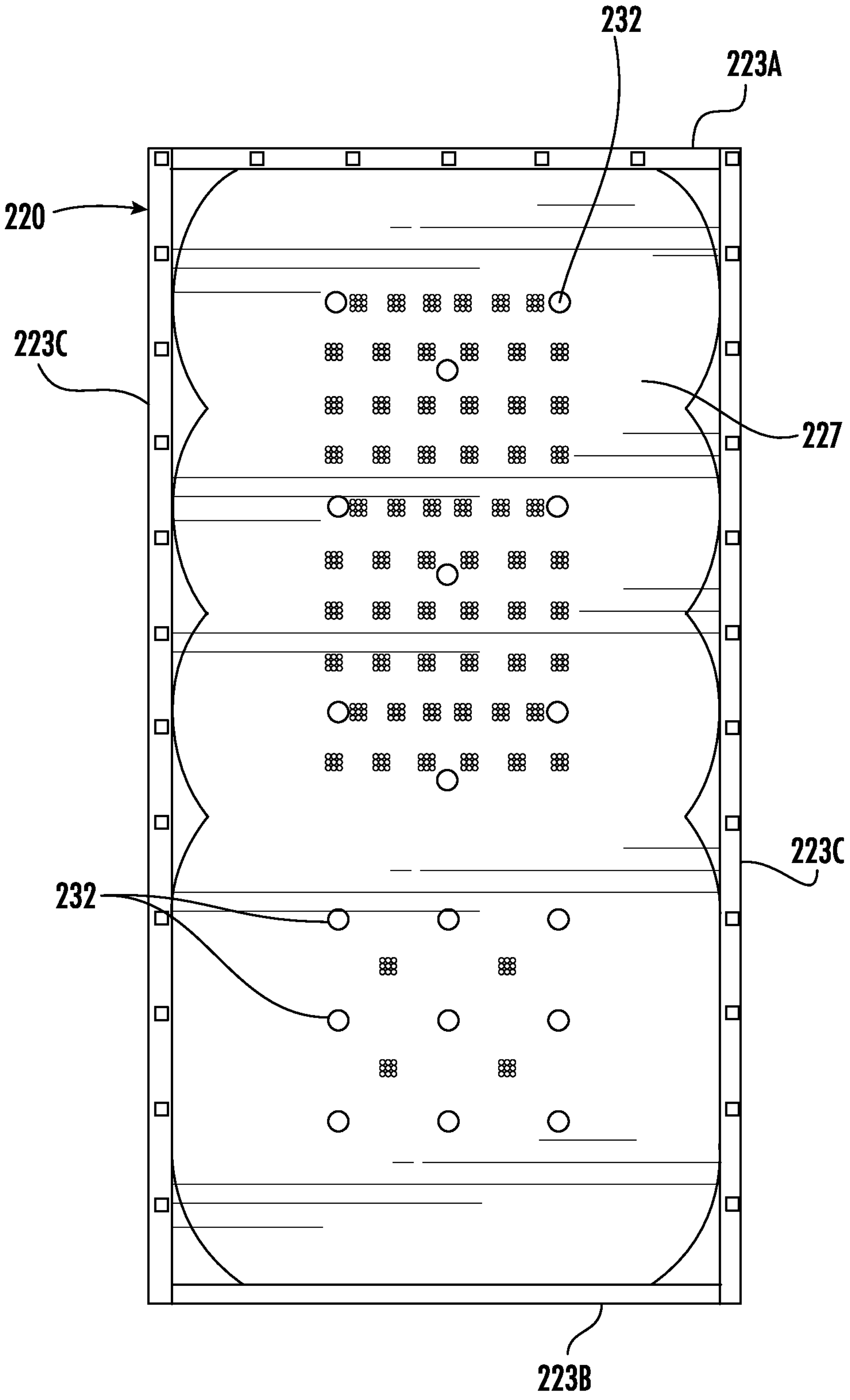
FIG. 18B is a bottom plan view of the inflatable patient support device of FIG. 17 shown in a non-inflated state according to one embodiment.

Inflatable body 230 of support device 220 may include one or more inflation-limiting structures to create a specific inflated shape for the support device 220. In general, an inflation-limiting structure is a structure connected to one or both of top and bottom sheets 226, 227 of cavity 231 that limits the degree to which top and bottom sheets 226, 227 can move apart from each other during inflation. For example, as with the embodiment of FIG. 1, the inflatable body 230 of device 220 includes a plurality of connection areas 232 between top sheet 226 and bottom sheet 227 to form inflation-limiting structures. Connection areas 232 limit the relative expansion of top sheet 226 and bottom sheet 227, thereby acting as inflation-limiting structures. The areas between connection areas 232 swell when support device 220 is inflated to a degree determined by factors such as the configuration and orientation of other inflation limiting structures. The inflation limiting structures may have various different configurations according to various alternative embodiments When fully inflated, support device 220 has a shape defined by the configuration of edges 223A-C of support device 220, and the arrangement of the inflation-limiting structures, among other factors. The arrangement of connection areas 232 (e.g., spacing, location, and orientation with respect to each other) may influence the degree of inflation that occurs locally around each connection area 232, and connection areas 232 may be arranged in various patterns to accomplish specific desired shapes and characteristics of support device 220 upon inflation. FIGS. 18A-18B show top and bottom views of the support device 220 of FIG. 17.

As shown in FIGS. 17 and 18A, support device 220 further includes one or more inflation ports 280. Inflation port 280 may be positioned in several possible locations on support device 220. Inflation port 280 is configured to be coupled to an air output 281 (see FIG. 19). In some embodiments, support device 220 includes multiple ports 280, such as ports 280 provided on or near one or more different edges 223A-C of support device 220. Ports 280 may be used along any edge 223A-C of support device 220. If two inflation ports 280 are included, then support device 220 may be configured such that only one of the inflation ports 280 is used at any time. For example, a second inflation port 280 may be used if two air outputs 281 are required to inflate support device 220, such as for patients having a high body mass.

Figure 19:
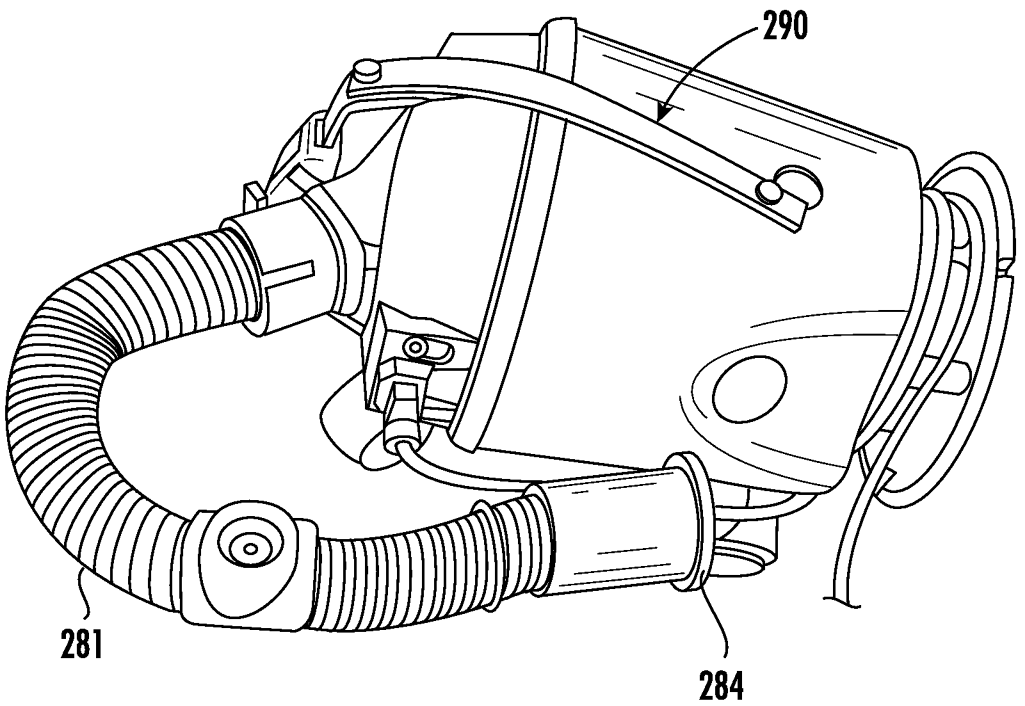
FIG. 19 is a perspective view of a second embodiment of a pump usable as an air output in connection with an inflatable patient support device according to various embodiments.
Figure 20:
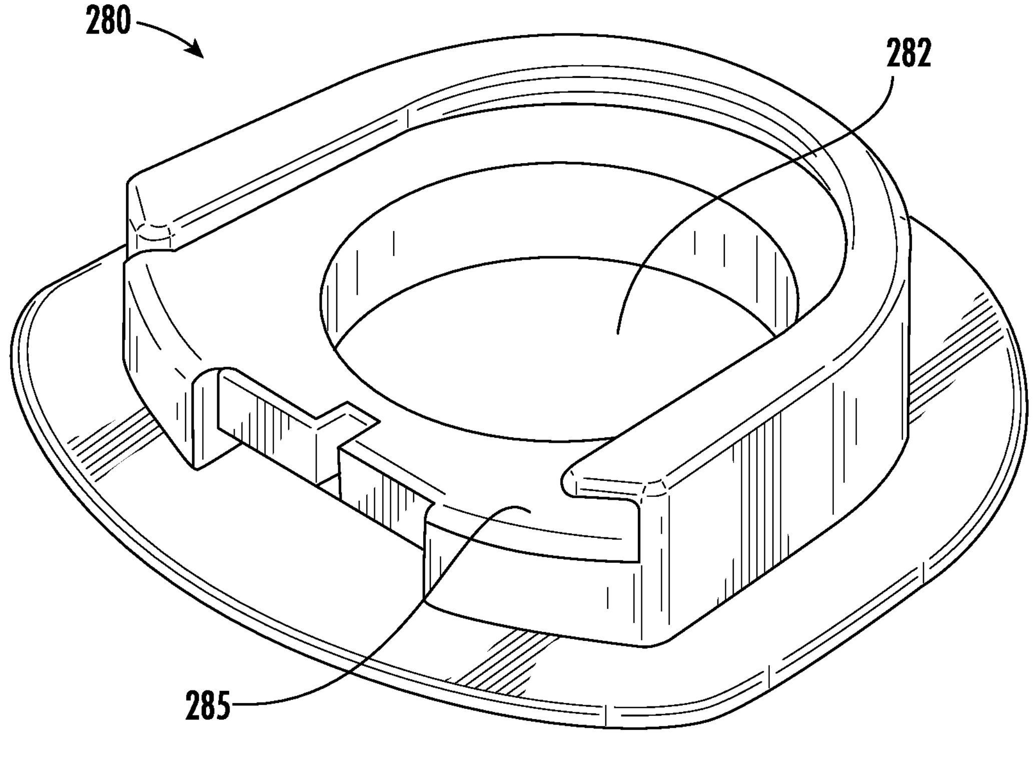
FIG. 20 is a perspective view of a second embodiment of an inflation port usable in connection with an inflatable patient support device.

In one embodiment, such as that shown in FIG. 20, port 280 includes an opening 282 configured to be in communication with a portion of air output 281 provided by the pump shown in FIG. 19. A retaining mechanism is configured to retain the portion of air output 281 in communication with opening 282. As shown in FIG. 20, in one embodiment retaining mechanism includes a slot 285. Slot 285 extends around at least a portion of opening 282 and receives a flange 284 of air output 281 (see FIG. 19) to retain air output 281 in a desired position. Air output 281 illustrated in FIG. 19 includes a hose connected to a pump 290 that pumps air through air output 281. The inflation components disclosed herein are described for use with air, but may be used with any suitable gas.

Though the foregoing system including device 20 and positioning apparatus 50, and the components thereof, are intended for single use and then disposal, the system and any of the components thereof may be refurbished for reselling and reusing. Refurbishment of the device may include steps such as inspecting the device, removing foreign particles, stains, or odors by washing one or more surfaces of the device, repairing tears or damage to the device, repairing or supplementing the stitching, such as at the seams, replacing any elements or components, replacing missing items from a kit, etc. Refurbishing may include decontaminating the system and/or any of the components such as by sterilization means, such as the use of gamma radiation, electron-beam radiation, X-ray radiation, Ethylene oxide (EtO), steam, such as through the use of an autoclave, or any combination thereof. And, refurbishing and reselling may include repackaging the system and elements thereof.

The construction and arrangement of the elements disclosed herein in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the various embodiments without departing from the scope of the appended claims.

What is claimed is:

1. A method for positioning a patient, the method comprising:
- positioning the patient on a patient support device;
- placing a positioning apparatus such that a portion is between the patient support device and a support surface on which the patient support device rests, the positioning apparatus including:
  - a body comprising a ramped surface,
  - a tail extending from a front end of the body, the tail comprising an elongated piece of material, and
  - a directional guide material coupled to the ramped surface and configured to interface with the patient support device, wherein the directional guide material inhibits relative movement in a first direction between the patient support device and the positioning apparatus; and
- moving the tail laterally relative to the patient while a first portion of the tail is between the patient support device and the support surface and a second portion of the tail is not between the patient support device and the support surface, thereby moving the body underneath the patient to support the patient in a desired position.

2. The method of claim 1, wherein the directional guide material inhibits relative movement in the first direction between the patient support device and the positioning apparatus more than relative movement in a second direction between the patient support device and the positioning apparatus.

3. The method of claim 2, wherein the first direction is perpendicular to the second direction.

4. The method of claim 2, wherein the first direction is opposite of the second direction.

5. The method of claim 1, wherein the patient support device includes a top sheet defining a first coefficient of friction and a bottom sheet defining a second coefficient of friction that is different from the first coefficient of friction.

6. The method of claim 1, wherein the patient support device includes an inflatable patient support device comprising a top sheet and a bottom sheet that define a cavity when the inflatable patient support device is inflated.

7. The method of claim 6, wherein the bottom sheet includes a plurality of passages configured to permit air to pass from the cavity to an exterior of the inflatable patient support device.

8. The method of claim 6, wherein the inflatable patient support device includes one or more inflation limiting structures coupled to the top sheet and the bottom sheet and configured to limit separation between the top sheet and the bottom sheet proximate the one or more inflation limiting structures.

9. The method of claim 8, wherein the one or more inflation limiting structures includes a first inflation limiting structure and a second inflation limiting structure; and the bottom sheet includes a plurality of passages positioned between the first inflation limiting structure and the second inflation limiting structure, the plurality of passages being configured to permit air to pass from the cavity to an exterior of the inflatable patient support device.

10. A patient positioning system, the patient positioning system comprising:
- an inflatable patient support device having a width in a direction; and
- a positioning apparatus including:
  - a wedge-shaped body, the wedge-shaped body configured to be placed under the inflatable patient support device to support a patient in a desired position, and
  - a tail comprising an elongated piece of material extending from a front end of the wedge-shaped body, wherein a length of the tail in the direction is greater than the width of the inflatable patient support device;
- wherein the tail is coupled to the wedge-shaped body using at least one of an adhesive or stitching.

11. The patient positioning system of claim 10, wherein the wedge-shaped body further comprises a base wall and a ramp surface.

12. The patient positioning system of claim 10, wherein the tail is configured to slide between a bottom surface of the inflatable patient support device and a support surface to position the wedge-shaped body relative to the patient to support the patient in the desired position.

13. The patient positioning system of claim 10, wherein the tail is coupled to the wedge-shaped body along an entire width of the wedge-shaped body.

14. The patient positioning system of claim 10, wherein the tail is between 0.5 meters and 3 meters in length.

15. The patient positioning system of claim 10, wherein a portion of the tail is configured to bundle to limit overhang of the tail from a support surface.

16. A patient positioning apparatus, the patient positioning apparatus comprising:

a wedge-shaped body, the wedge-shaped body configured to be placed under a support device to support a patient in a desired position; and a tail comprising an elongated piece of material extending from a front end of the wedge-shaped body, wherein a length of the tail in a direction is greater than a width of the support device in the direction;

wherein the tail is coupled to the wedge-shaped body using at least one of an adhesive or stitching.

17. The patient positioning apparatus of claim 16, wherein the wedge-shaped body further comprises a base wall and a ramp surface.

18. The patient positioning apparatus of claim 16, wherein the tail is configured to slide between a bottom surface of the support device and a support surface to position the wedge-shaped body relative to the patient to support the patient in the desired position.

* * * * *